(12) United States Patent
Tanizawa et al.

(10) Patent No.: US 9,083,684 B2
(45) Date of Patent: Jul. 14, 2015

(54) COMMUNICATION NODE, KEY SYNCHRONIZATION METHOD, AND KEY SYNCHRONIZATION SYSTEM

(71) Applicant: KABUSHIKI KAISHA TOSHIBA, Minato-ku (JP)

(72) Inventors: Yoshimichi Tanizawa, Yokohama (JP); Shinichi Baba, Bristol (GB)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 14/018,800

(22) Filed: Sep. 5, 2013

(65) Prior Publication Data
US 2014/0181522 A1  Jun. 26, 2014

(30) Foreign Application Priority Data

Sep. 7, 2012  (JP) ................... 2012-197825

(51) Int. Cl.
  *H04L 9/00*  (2006.01)
  *H04K 1/00*  (2006.01)
  *H04L 29/06*  (2006.01)
(52) U.S. Cl.
  CPC ..................................... *H04L 63/06* (2013.01)
(58) Field of Classification Search
  CPC ........... H04L 9/08; H04L 63/08; H04L 63/06; H04L 63/061; H04L 9/12; H04L 9/0816; H04L 9/0819
  USPC ........ 380/255, 274, 277; 713/168, 171; 726/1
  See application file for complete search history.

(56) References Cited

U.S. PATENT DOCUMENTS

| | | | | |
|---|---|---|---|---|
| 6,810,405 | B1 * | 10/2004 | LaRue et al. ................. | 707/613 |
| 7,783,042 | B2 * | 8/2010 | Maeda et al. ................. | 380/277 |
| 7,818,562 | B2 * | 10/2010 | Rich et al. .................... | 713/150 |
| 7,890,758 | B2 * | 2/2011 | Dettinger et al. ............. | 713/171 |
| 2006/0018475 | A1 * | 1/2006 | Vig et al. ...................... | 380/256 |
| 2006/0062392 | A1 | 3/2006 | Lee et al. | |
| 2009/0037492 | A1 * | 2/2009 | Baitalmal et al. ............. | 707/201 |

FOREIGN PATENT DOCUMENTS

JP  2008-154019  7/2008

OTHER PUBLICATIONS

U.S. Appl. No. 13/714,809, filed Dec. 14, 2012, Yoshimichi Tanizawa, et al.

(Continued)

*Primary Examiner* — Hosuk Song
(74) *Attorney, Agent, or Firm* — Oblon, McClelland, Maier & Neustadt, L.L.P.

(57) ABSTRACT

In general, according to one embodiment, a communication node includes a key synchronization controller and an application communicator. The key synchronization controller controls synchronization of an application key on the basis of a node-based signaling process and a session-based signaling process, where the former process is for starting or ending exchanging of an application key between a correspondent node and the communication node and the latter process is for synchronizing a rule for assignment of the application key to a session with the correspondent node, the session shared with the correspondent node. The application communicator provides the application key in accordance with the rule, the key for use by an application having the session.

9 Claims, 13 Drawing Sheets

(56) References Cited

OTHER PUBLICATIONS

O. Maurhart, "QKD Networks Based on Q3P", Chapter 8, Kollmitzer C., et al. (Eds.), Applied Quantum Cryptography, Lect. Note Phys. 797, DOI 10.1007/978-3-642-04831-9, 2010, pp. 151-171.

Mehrdad Dianati, et al., "Architecture and protocols of the future European quantum key distribution network", Security and Communication Networks, 1:57-74. DOI:10.1002/sec. 13, 2008, pp. 57-74.

Japanese Office Action issued Aug. 5, 2014, in Japan Patent Application No. 2012-197825 (with English translation).

Yoshimichi Tanizawa, et al. "Suggestion of Secure Network designed for Quantum Key Distribution Technology." Papers 2 of Communications Society Conference of the Institute of Electronics, Information and Communication Engineers, 2012. The Institute of Electronics, Information and Communication Engineers. Aug. 28, 2012. p. 139.

Japanese Office Action isued Aug. 5, 2014, in Japanese Patent Application No. 2012-197825 (English translation).

Yoshimichi Tanizawa, et al. "Suggestion of Secure Network designed for Quantum Key Distribution Technology" Papers 2 of Communications Society Conference of the Institute of Electronics, Information and Communication Engineers. 2012. The Institute of Electronics, Information and Communication Engineers, Aug. 28, 2012, page 139.

\* cited by examiner

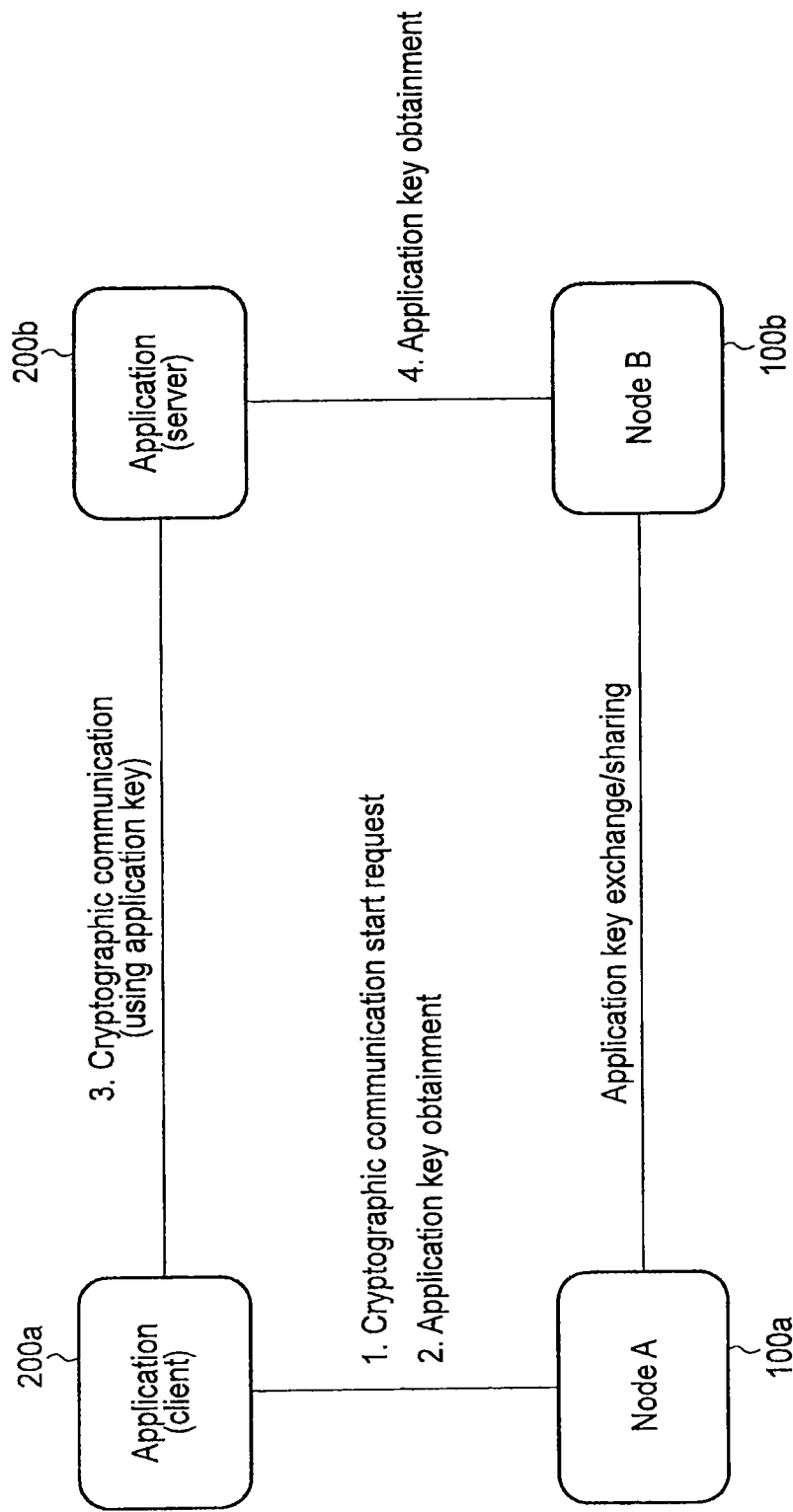
F I G. 5

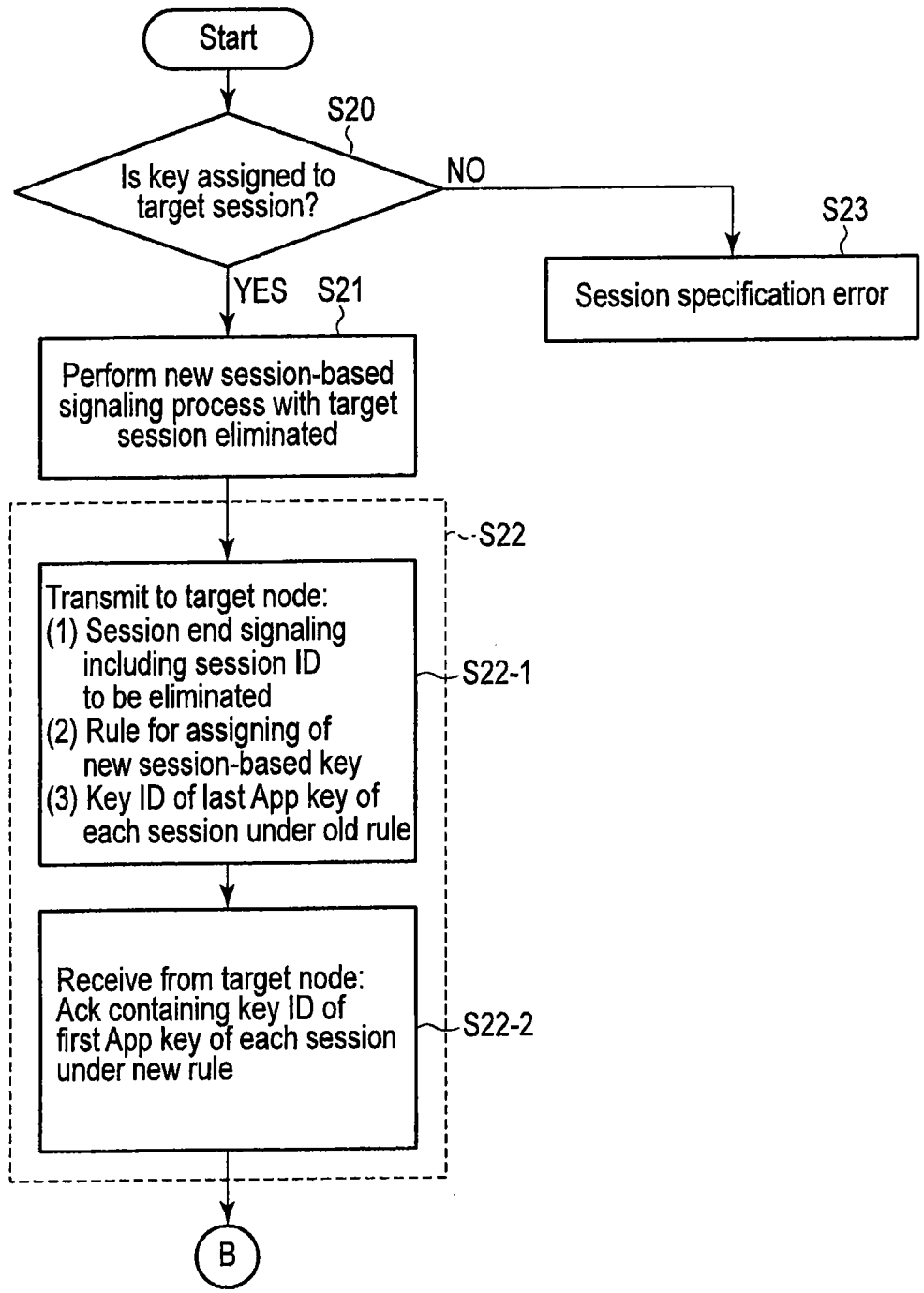
F I G. 10

COMMUNICATION NODE, KEY SYNCHRONIZATION METHOD, AND KEY SYNCHRONIZATION SYSTEM

CROSS-REFERENCE TO RELATED APPLICATIONS

This application is based upon and claims the benefit of priority from Japanese Patent Application No. 2012-197825, filed Sep. 7, 2012, the entire contents of which are incorporated herein by reference.

FIELD

Embodiments described herein relate generally to a communication node, a key synchronization method and a key synchronization system.

BACKGROUND

A cryptographic communication network is a network constituted by a plurality of nodes being interconnected via a plurality of links. Each node is provided with the functionality of generating random numbers and sharing them with an opposite node connected via a link, and the functionality of performing cryptographic communication via the link using the random numbers as a cryptographic key (referred to as "link key" hereinafter). Some of the plurality of nodes each are provided with the functionality of generating random numbers different from the random numbers used as a link key and functionality of transmitting the generated random numbers to another node via a link.

An application used on the cryptographic communication network is provided with the functionality of performing cryptographic communication with another application using other random numbers as a cryptographic key (referred to as "application key" hereinafter), the numbers different from those constituting a link key.

The functionality of generating and sharing a cryptographic key between nodes is realized by, for example, a technique generally referred to as quantum cryptographic communication. In this communication, a node generates a link key and an application key, encrypts the application key with the link key and transmits the encrypted application key to another node. This technique is sometimes referred to as quantum key distribution (QKD).

BRIEF DESCRIPTION OF THE DRAWINGS

FIG. 5 is a diagram showing an outline sequence of starting cryptographic communication;

FIG. 10 is a flow chart of a cryptographic communication end process;

DETAILED DESCRIPTION

In general, according to one embodiment, a communication node includes a key synchronization controller and an application communicator. The key synchronization controller controls synchronization of an application key on the basis of a node-based signaling process and a session-based signaling process, where the former process is for starting or ending exchanging of an application key between a correspondent node and the communication node and the latter process is for synchronizing a rule for assignment of the application key to a session with the correspondent node, the session shared with the correspondent node. The application communicator provides the application key in accordance with the rule, the key for use by an application having the session.

The following is a description of embodiments with reference to the accompanying drawings.

Figure 1:
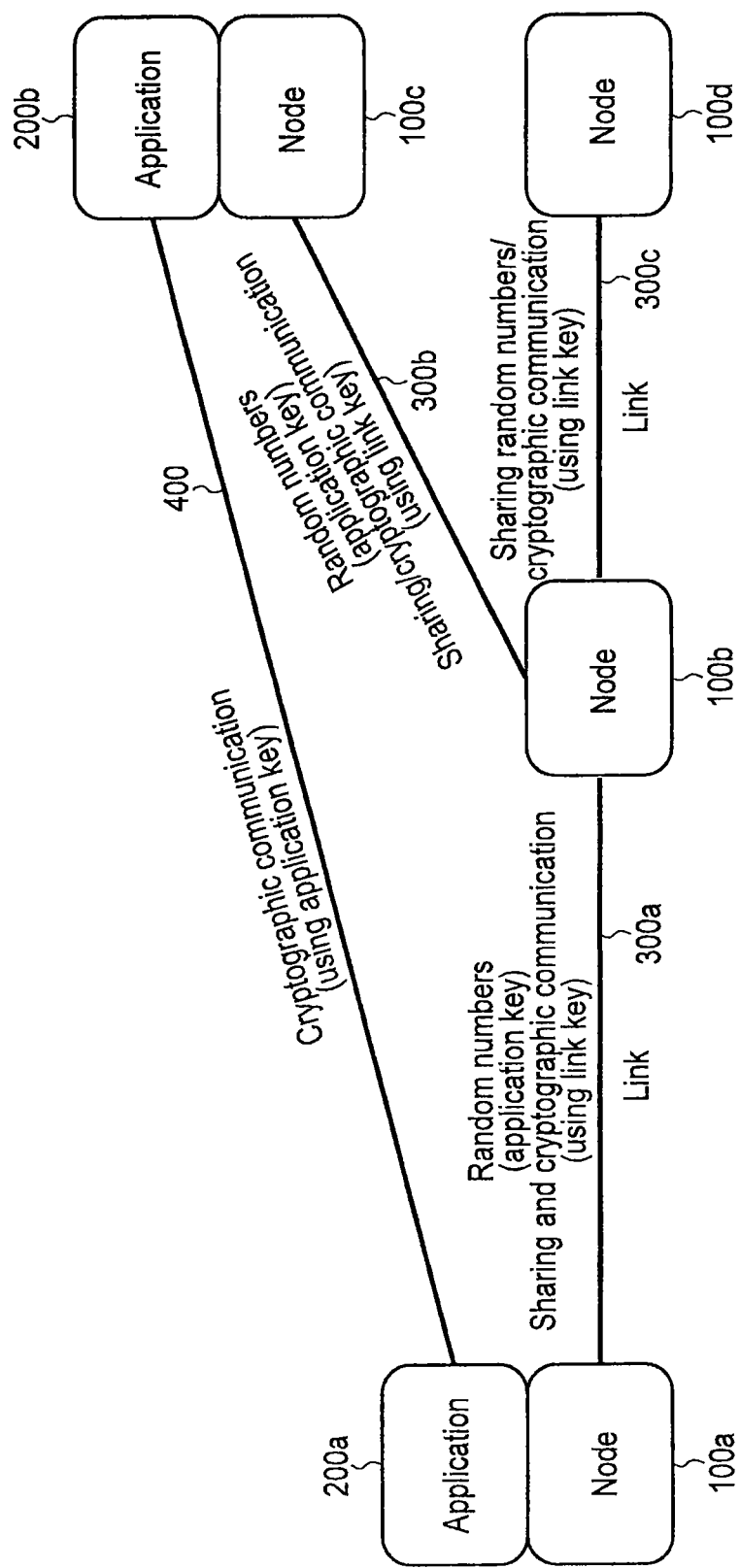
FIG. 1 is a diagram illustrating a cryptographic communication network according to an embodiment.

FIG. 1 is a diagram illustrating a cryptographic communication network according to an embodiment. In the network, a plurality of nodes (e.g., 100a through 100d) are interconnected via a plurality of links (e.g., 300a through 300c). An individual node performs cryptographic communication with an opposite node connected thereto via a link. For example, the node 100a performs cryptographic communication with the node 100b via the link 300a by using a given link key. The node 100b performs cryptographic communication with the node 100c via the link 300b by using another link key. The node 100b performs cryptographic communication with the node 100d via the link 300d by using yet another link key.

The functionality of generating and sharing a cryptographic key between nodes is realized by, for example, the quantum key distribution (QKD). For example, the node 100a encrypts an application key with the link key and transmits the encrypted application key to the node 100b via the link 300a.

An application on the cryptographic communication network performs cryptographic communication with another application by using an application key. For example, the application 200a performs cryptographic communication with an application 200b via an inter-application communication link 400 by using the application key. The application may be realized integrally with a node or by a terminal independent of a node. FIG. 1 shows an example of an application being realized integrally with a node, while FIG. 2 (described below) is applicable to an example of an application being realized as a terminal independent of a node.

Figure 2:
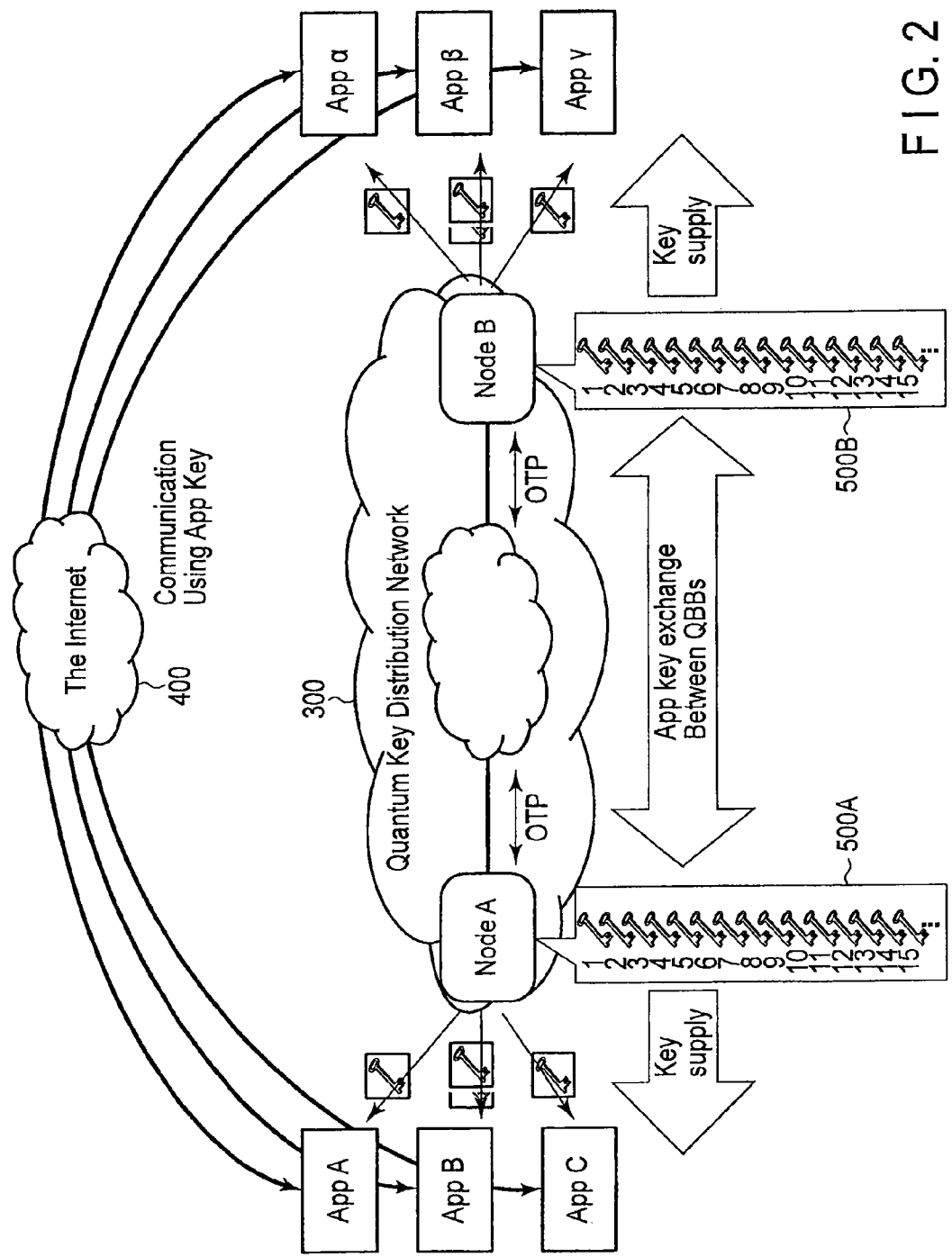
FIG. 2 is a diagram showing cryptographic communication between applications and the provision of a key therebetween.

FIG. 2 is a diagram showing cryptographic communication between applications and the provision of a key therebetween. A plurality of applications A, B and C are connected to a node A. A plurality of applications α, β and γ are connected to the node B. The node A and the node B constitute a cryptographic communication network 300. The node A distributes a plurality of application keys 500A to the applications A, B and C. The node B distributes a plurality of application keys 500B to the applications α, β and γ. For example, using Internet 400, the application A performs cryptographic communication with the application α, the application B performs cryptographic communication with the application β, and the application C performs cryptographic communication with the application γ.

For such cases, there is no disclosed method for the node A and the node B to agree on matching an application key to an application or synchronizing an application key between the nodes, the application to be used next. Nor is there a disclosed method of how to assign an application key between the node A and the node B when an application starts cryptographic communication anew and ends it. Furthermore, there is no disclosure related to the timing for a node to start generating an application key at the beginning.

The following are two conceivable methods as typical methods for solving the problems described above. There are benefits and shortfalls respectively associated with the two methods, as described below.

A method 1 is to start generation and sharing of an application key between nodes in association with an application starting a session of cryptographic communication or ending the session. The method 1 is to perform local management in units of application, bringing forth a benefit of facilitating maintaining of the synchronism of an application key. However, the method 1 is faced with a difficulty in optimization such as sharing an application key in advance of an application starting the cryptographic communication. Further, in the case of adopting the method 1, the application key already shared for an application is typically discarded when the application is finished. Therefore, an effective use of the application key will be compromised.

A method 2 is to exchange an application key autonomously by nodes, independently of an application. An application key is assigned to an application on the basis of a node. In the method 2, a node, in place of an individual application, is to perform an integral management. In this case, it is possible to accomplish optimization such as sharing an application key in advance of starting the cryptographic communication. Further, according to the method 2, it is easy to effectively use an application key such as allowing an already shared application key for a given application to be used for another application when the given application is ended.

However, in a state in which a plurality of applications are connected to a single node, with the start and end of the applications occurring mutually asynchronously, the method 2 is faced with a technical difficulty in maintaining the synchronism of the application key for all of the applications. No concrete method for solving such problem has been established.

Therefore, the embodiments described in the following adopt, as a basis, the above described method 2 that can bring forth the benefit of effectively using an application key, and further realize a proper synchronization of the application key.

An embodiment introduces a two-layer-type architecture as regards to sharing and synchronizing of an application key between nodes, as described below.

In a first layer, a node-based signaling process is performed for starting or ending exchanging of an application key between a correspondent node and the node itself. The first layer is independent of a second layer (described next), and capable of sharing an application key between nodes independent of occurrence of cryptographic communication (referred to as "session" hereinafter) performed by an application.

In the second layer, a node carries out communication to assign an application key to each session every time a new session occurs or the session ends. Specifically, the node performs a session-based signaling process for synchronizing, with a correspondent node, a rule for assignment of an application key to a session shared with the correspondent node. This configuration enables a node to assign an application key requested from an application (i.e., a session) while guaranteeing the synchronization of the application key for each application (i.e., session).

Figure 3:
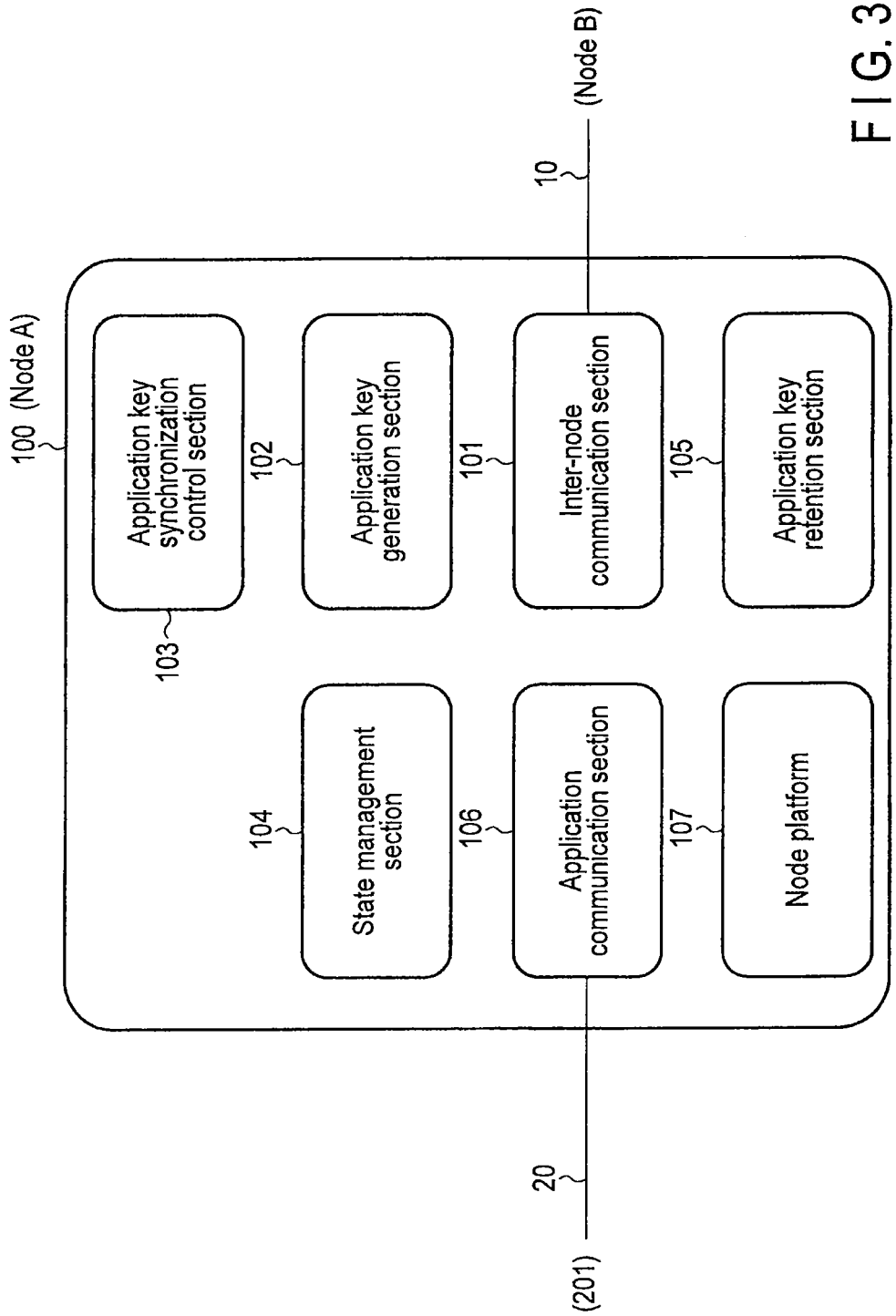
FIG. 3 is a block diagram showing a node according to the embodiment.

FIG. 3 is a block diagram showing a node according to the embodiment. A node 100 is, for example, the node 100*a* shown in FIG. 1 and corresponds to the node A shown in FIG. 2, The node A includes an inter-node communication section 101, an application key generation section 102, an application key synchronization control section 103, a state management section 104, an application key retention section 105, an application communication section 106, and a node platform 107.

The inter-node communication section 101 uses the quantum cryptographic communication to generate random numbers and share them with an opposite node (i.e., the node B shown in FIG. 2) connected via an inter-node cryptographic communication link 10. The generated random numbers are managed as a link key. The link key is used when inter-node data communication with another node connected is carried out via the inter-node cryptographic communication link 10. The inter-node data communication is cryptographic communication in which data is encrypted with a link key.

Here, the aforementioned "another node" may be an opposite node (the node B shown in FIG. 2) that is directly connected via the inter-node cryptographic communication link 10, or may be yet another node (e.g., the node 100*c* shown in FIG. 1) that is connected to the opposite node via another inter-node cryptographic communication link. In the latter case, the inter-node communication section 101 may provide a routing function for performing communication by straddling a plurality of nodes in the cryptographic communication network 300. The data exchanged between nodes by the function of the inter-node communication section 101 is, for example, the data of an application key. In this case, the data of the application key is encrypted with a link key managed by a node and is used in carrying out the cryptographic communication.

The application key generation section (referred to as "key generation section" hereinafter) 102 generates an application key (App key) in the form of random numbers. A key ID (Key ID) is attached to each generated application key. A format of the key ID of an application key is not specifically defined herein; it is, however, presumed that the sequence of the key IDs is identified by, for example, consecutive numbers. The generated application keys themselves are retained in a retention section 105 (described later). It is appreciated that the retention section 105, in place of the key generation section 102, may attach the key IDs (i.e., correlation).

The retention section 105 retains the application keys therein. The retained application keys therein include a key generated by the key generation section 102 and a key received from another node via the inter-node communication section 101.

The application keys retained in the node 100 are provided to an application 200. Specifically, the application communication section 106 extracts an application key retained in the retention section 105 of the node 100 and transmits the extracted application key to the key obtainment section 201 of the application 200 via a node-to-application link 20. The node-to-application communication may use, for example, a method disclosed in the specification put forth in the Japanese patent application NO. 2012-67719 filed by the same applicant of the present patent application.

The key provided to the application 200 may be eliminated from the retention section 105. The application key retained in the retention section 105 is one of the most important pieces of data for security of a cryptographic communication system and therefore may be subjected to a security measure such as encryption, prevention of alteration, access control by means of a file system and/or an operating system (OS). Although the retention section 105 can be realized by various methods, it can be realized as a file system and/or a database.

The application communication section 106 communicates with the application 200 via the node-to-application link 20 and receives a request from the application 200. The request includes a cryptographic communication start or end request (i.e., an application key provision start or end request), an application key obtainment request, or the like, from the application 200.

Individual cryptographic communication carried out by the application 200 is referred to as "session". A session identifier (session ID) is attached to a session. Information of the session is managed by a state management section 104 (described later). The information of the session represents information such as what kind of session exists, and which application key is to be assigned to what session.

The application communication section 106 provides data of an application key to the key obtainment section 201 of the application 200. A unit of the data of the application key in providing the data to the application 200 may be different from a unit of data when a node 100 exchanges an application key with another node. Therefore, the application communication section 106 and the retention section 105 manage data of application keys as to what extent the pieces of data of the application keys have already been provided, of application keys already assigned to sessions.

The state management section 104 manages various categories of state information such as the information of the aforementioned session, and information of a rule and a status related to exchanging of an application key. These categories of information are referred to and changed by the aforementioned application communication section 106 or a synchronization control section 103 (described below).

The node platform 107 provides: an operating system function of a computer that is necessary for managing and operating other components included in a node; a basic network function; a security function; and the like.

The synchronization control section 103 is a characteristic part of the present embodiment. The synchronization control section 103 controls the inter-node communication section 101, the key generation section 102, the retention section 105, and the application communication section 106, as described below:

The inter-node communication section 101 transmits an application key retained by the key retention section 105 to a correspondent node via the inter-node cryptographic communication link 10.

The inter-node communication section 101 receives an application key from the correspondent node via the inter-node cryptographic communication link 10 so that the retention section 105 retains the received application key.

The key generation section 102 generates an application key.

The application communication section 106 receives various requests from the application 200, and in response to the requests the inter-node communication section 101 executes a signaling protocol between the correspondent node and the node itself via the inter-node cryptographic communication link 10 for assigning an application key.

In accordance with a result of executing the signaling protocol, the application communication section 106 starts or ends assignment of the application key to a session, the key retained in the key retention section 105.

The above described configuration of the node according to the embodiment is put forth as a mere example.

Figure 4:
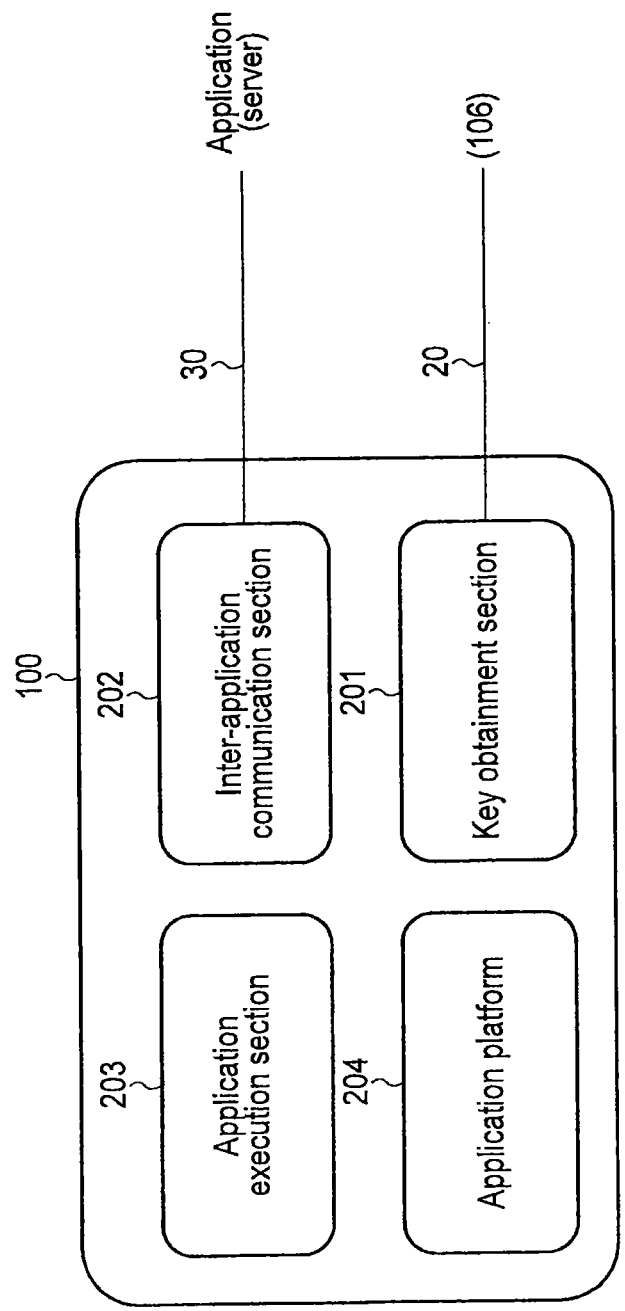
FIG. 4 is a block diagram showing an application according to the embodiment.

FIG. 4 is a block diagram showing an application according to the embodiment. The application 200 includes a key obtainment section 201, an inter-application communication section 202, an application execution section 203 and an application platform 204.

The key obtainment section 201 communicates with the node 100 (specifically, the application communication section 106 of the node 100) connected via the inter-node cryptographic communication link 10 and obtains, from the node 100, an application key necessary for the application 200 to perform cryptographic communication.

In starting to obtain the application key, the key obtainment section 201 requests for starting to obtain the application key, or, in ending obtainment of an application key, requests for ending obtainment of it. Usage of an application key as discriminated in the above is identified as a session. The key obtainment section 201 retains and manages the obtained application key. The obtained application key is used for inter-application cryptographic communication by the inter-application communication section 202.

The application execution section 203 executes an application function of performing cryptographic communication. A category of an application is not limited, provided that the application is for use in communication, and is, for example, a video transmission. The inter-application communication section 202 is used for exchanging of data in carrying out the cryptographic communication.

The inter-application communication section 202 provides the functionality necessary for operation of the application execution section 203, that is, the function of communication, and that of encrypting and decrypting communication data. Upon receiving transmission data from the application execution section 203, the inter-application communication section 202 encrypts the data and transmits the encrypted data via an inter-application cryptographic communication link 30.

Further, upon receiving data via the inter-application cryptographic communication link 30, the inter-application communication section 202 encrypts the data and hands the encrypted data over to the application execution section 203. If an application key is further necessary for encryption or decryption, the inter-application communication section 202 requests the key obtainment section 201 for obtaining the application key anew.

According to the present embodiment, it is unimportant as to what category of encryption algorithm the inter-application communication section 202 is to use. For example, Vernam's One-Time Pad or a block code such as Advanced Encryption Standard (AES) may be used. Further, a message authentication may be used, in place of a code. However, it is appreciated that at least one of encryption algorithms to be used by the inter-application communication section 202 shall be an application key provided by the node 100 and obtained by the key obtainment section 201.

The application platform 204 provides: an operating system function of a computer necessary for managing and operating other components of the application 200; a basic network function; a security function; and the like.

The above described configuration of the application according to the present embodiment is merely an example.

FIG. 5 is a diagram showing an outline sequence of starting cryptographic communication. FIG. 5 illustrates a presumed network configuration. The node A and the node B are in a state in which they can share an application key. The node A is connected to a client application 200a, while the node B is connected to a server application 200b. Other nodes, in addition to the nodes A and B, may be connected via a link (not shown in the figure). A set of applications may be connected here by way of a different network independent of the network constituted by the node A and the node B.

(1) The client application 200a requests the node A for starting cryptographic communication. In response to the request, the node A and the node B start assigning of an application key for the session of the application. The processing at the start of assigning of the application key is described later.

(2) The client application 200a obtains an application key from the node A.

(3) The client application 200a starts the cryptographic communication with the server application 200b, the communication encrypted with the application key obtained from the node A.

(4) The server application 200b obtains an application key necessary for decryption from the node B, thereby establishing the cryptographic communication.

It is appreciated that, although the server application 200b obtains an application key after receiving data for the cryptographic communication according to the configuration described above, there is a possible optimization method in which the server application 200b obtains an application key from the node B in advance of starting the cryptographic communication.

Figure 6:
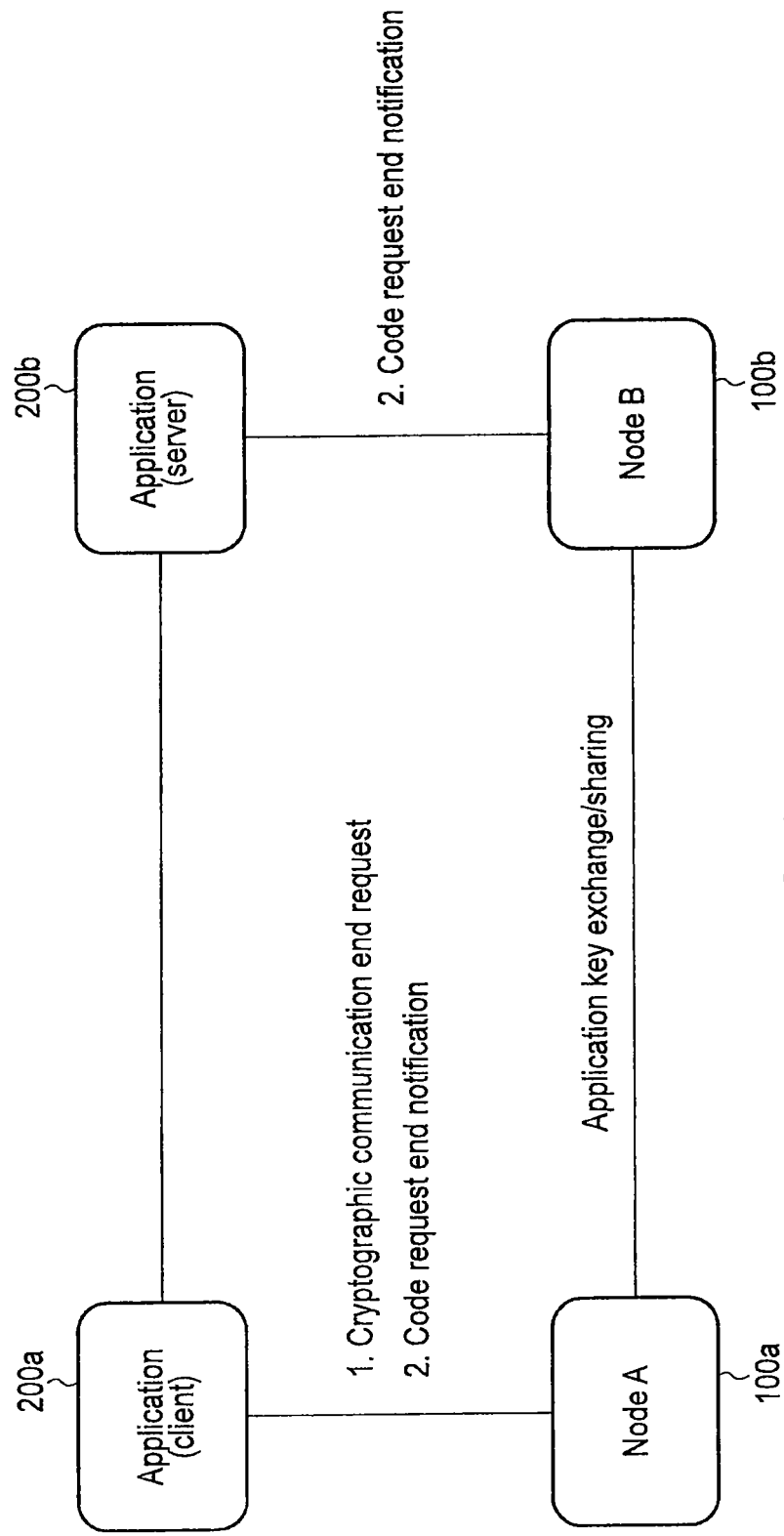
FIG. 6 is a diagram showing an outline sequence of ending cryptographic communication.

FIG. 6 is a diagram showing an outline sequence of ending the cryptographic communication.

(1) The client application 200a requests the node A for ending the cryptographic communication. In response to the request, the node A and the node B respectively end assigning of the application key for the session of the application. The processing at the end of assigning the application key is described later.

(2) Having ended the assigning of the application key, the node A and the node B respectively notify the client application 200a and the server application 200b of the ends of encryption requests.

A series of the above described cryptographic communication from the request for starting the cryptographic communication to the request for ending it is identified as a session.

The following is a detailed description of a communication process of exchanging an application key and synchronizing it between the node A and the node B. This process is broadly categorized into a cryptographic communication start process and a cryptographic communication end process.

<Cryptographic Communication Start Process>

Figure 7:
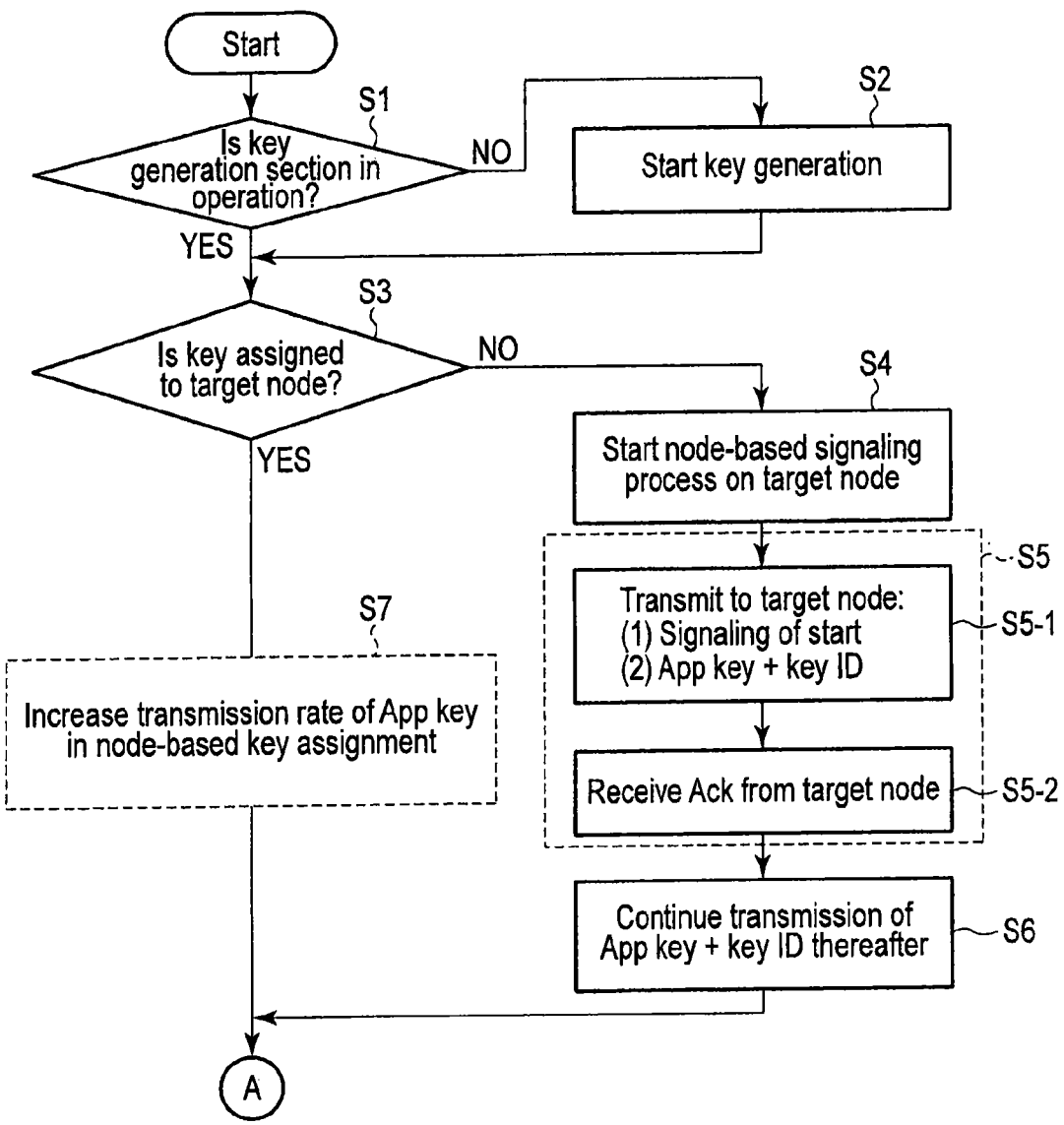
FIG. 7 is a flow chart of a cryptographic communication start process.
Figure 8:
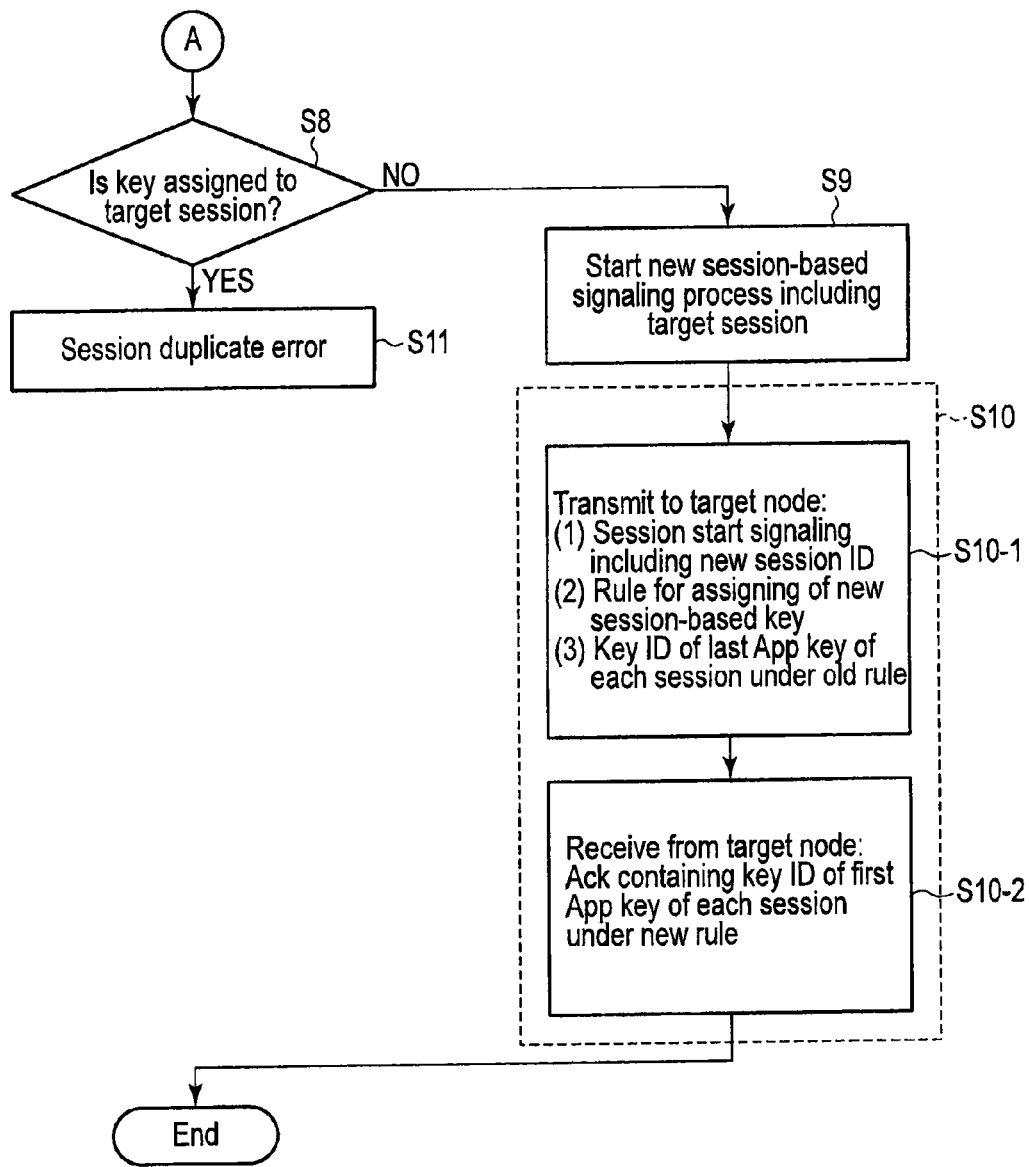
FIG. 8 is a flow chart of a cryptographic communication start process.

FIG. 7 and FIG. 8 are flow charts of a cryptographic communication start process.

First, the application communication section 106 of the node A receives a request for starting cryptographic communication from the client application 200a. In response to the request, the state management section 104 registers therein information of a session related to the cryptographic communication to be started by the client application 200a.

Here, the synchronization control section 103 checks whether the key generation section 102 is in operation (that is, whether in operation to generate random numbers) (step S1). If the key generation section 102 is not in operation, the synchronization control section 103 instructs it to start operating (step S2). If, however, it is determined that a large number of random numbers are already generated and accumulated therein and that there is no need to generate them anew, the synchronization control section 103 issues no more instruction. In contrast, if the key generation section 102 is already in operation, the synchronization control section 103 issues no more instruction. Alternatively in this case, an instruction may be given to prompt generation of a larger number of random numbers by quickening the operations of generating random numbers (i.e., increasing the transmission rate) (step S7).

The synchronization control section 103 refers to the state management section 104 to check whether a key is assigned to a target node determined from the session information (step S3). According to the present embodiment, a method for identifying a target node is not specifically defined. However, it is appreciated that the address of the target node may be acquired by the client application 200a explicitly specifying the address of the target node in a request for starting cryptographic communication, or by registering the address of the target node in the state management section 104, or by using a directory service.

If a key is not assigned to the target node (No for step S3), the synchronization control section 103 starts a node-based signaling process on the target node (step S4). In the node-based signaling process (step S5), the synchronization control section 103 transmits (1) signaling of the start and (2) an application key and a key ID (i.e., App key+Key ID) to the target node (step S5-1), and receives an Ack (an acknowledgement) for the transmission from the target node (step S5-2). Thereafter, the synchronization control section 103 continually transmits application keys and the key IDs (step S6).

In contrast, if a key is already assigned to the target node (Yes for step S3), the processing is shifted to the step S8 shown in FIG. 8. An alternative configuration may be to additionally execute the node-based signaling process in step S5, thereby speeding up a node-based key assigning process to increase the number of application keys to be shared.

The synchronization control section 103 registers, in the state management section 104, a change result associated with the node-based signaling process. When transmitting an application key, the inter-node communication section 101 transmits, to the target node, the application key that is generated by the key generation section 102 and retained by the retention section 105. When receiving an application key from the target node, the retention section 105 retains the received application key. The processing described above completes sharing of the application key between the nodes.

In step S8 shown in FIG. 8, the synchronization control section 103 refers to the state management section 104 to check whether assigning of a key to a target session has already been started, the session corresponding to the client application 200a that has received a request for staring the cryptographic communication, and, if the assigning is started (Yes for step S8), may end the processing without carrying out the subsequent processes. However, the very event that the request for starting the cryptographic communication has been received from the client application 200a is a duplicate request for establishing a session, and therefore the synchronization control section 103 reports the event to the client application 200a as an error (step S11).

If assigning of a key to the target session has not been started (No for step S8), the synchronization control section 103 starts a new session-based signaling process on sessions that include the target session (step S9).

In a session-based signaling process (step S10), the synchronization control section 103 transmits (1) a session-start signaling including a new session ID (session ID), (2) a rule for assignment of a new session-based key, and (3) the key ID (Key ID) of the last application key (App key) of each session under the old rule, to the target node (step S10-1). In response to the transmission, the synchronization control section 103 receives an Ack (an acknowledgement) containing the key ID (Key ID) of the initial application key (App Key) of each session to be performed under the new rule from the target node (step S10-2).

With the processing described above, the rule for assignment of a key to each session is determined, and the rule is agreed to between the nodes. That is, the assignment of an application key to be used for each session between the nodes is determined. The determined rule for assignment of a key is stored in the state management section 104.

In response to a request from the client application 200a, the data of an initial application key may be provided as, for example, a key stream. Specifically, when the application communication section 106 receives a request from the client application 200a, the synchronization control section 103 specifies the initial application key to be assigned to an applicable session in accordance with the rule for assignment of a key, the rule managed by the state management section 104, obtains the application key from the retention section 105 and hands it to the application communication section 106. The application communication section 106 holds the application key, cuts out, from the application keys, key data of a proper size requested from the client application 200a and provides the cut-out key data to the client application 200a.

Upon finishing the provision of one application key to the client application 200a, the application communication section 106 obtains the next application key by making a request to the synchronization control section 103, and continues to provide application keys to the client application 200a. It is appreciated that the application communication section 106 may store a plurality of (e.g., two) application keys in a buffer and provides an application key via the buffer so as to respond instantly to a request from the client application 200a.

Figure 9:
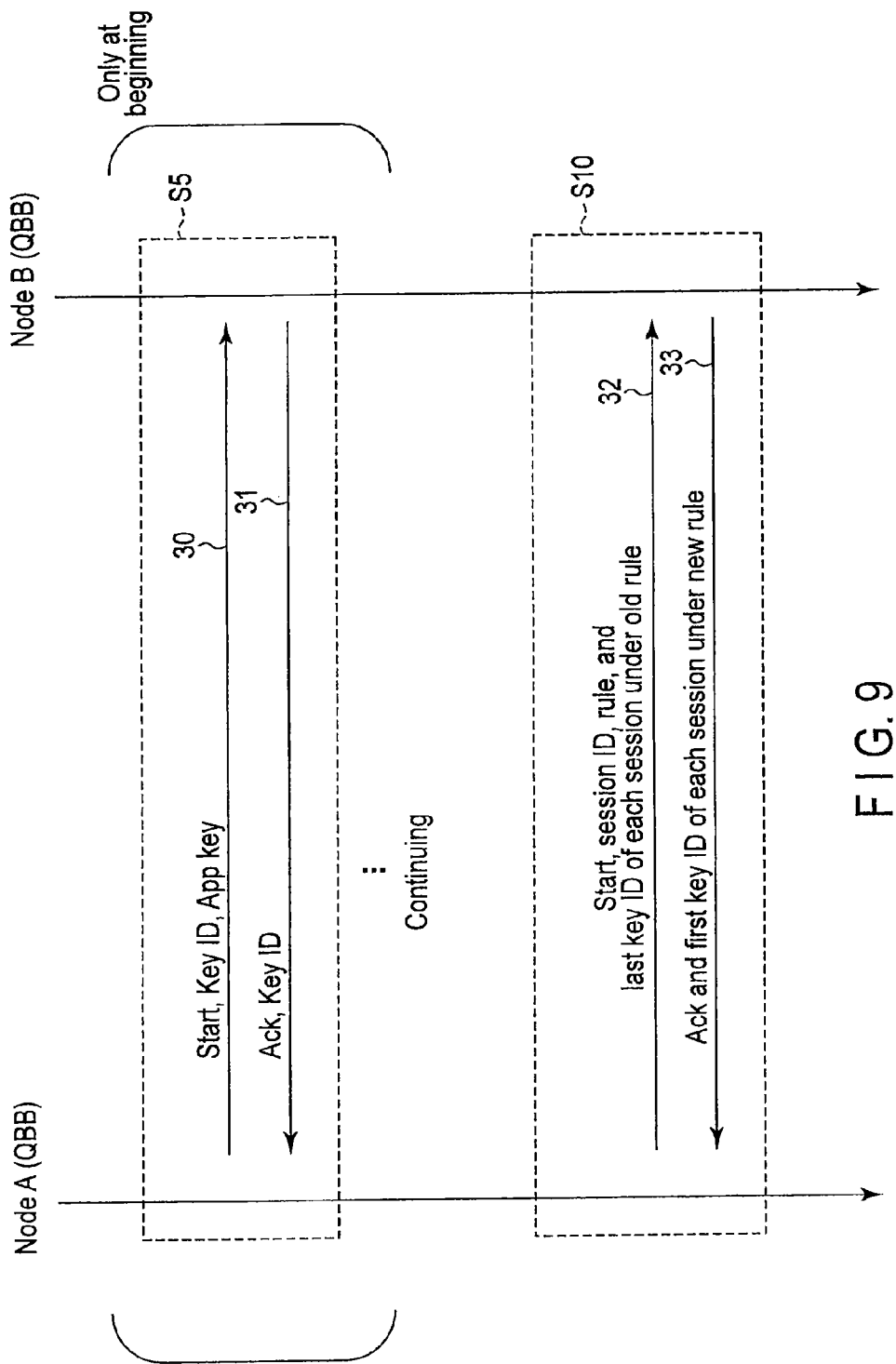
FIG. 9 is a diagram showing a sequence of a node-based signaling process and that of a session-based signaling process when starting cryptographic communication.

FIG. 9 shows a sequence of a node-based signaling process and that of a session-based signaling process when starting the cryptographic communication.

The node-based signaling process is an inter-node communication process corresponding to the step S5 shown in FIG. 7. The session-based signaling process is an inter-node communication process corresponding to the step S10 shown in FIG. 8.

In the node-based signaling process, the node A (it may be on a side that starts sharing of an application key, that is, a side that receives a request from the client application 200a) transmits a message 30 containing an identifier (Start) indicating that a node-based signaling process is started, a key ID (Key ID) and an application key (App Key) to the node B (i.e., a correspondent node). Receiving the message 30, the node B transmits a message 31 containing an identifier (Ack) indicating that the message has been received, and a reception-completed key ID (Key ID) to the node A.

Having finished the procedure described above, a sequence is continued in which the node A transmits the message 30 (although the message does not contain an identifier for a start) to the node B, followed by the node B receiving the message 31 from the node B. With this sequence, the node A and the node B are enabled to share an application key in the unit of the nodes.

While not shown in a figure herein, it may be possible to determine a rate of exchanging a requested application key in the message exchange described above.

In the session-based signaling process, the node A transmits, to the node B, a message 32 containing an identifier indicating that a session is added anew (option), a session identifier (session ID), a rule (referred to as "new rule" hereinafter) for assigning and using application keys respectively to the currently existing all sessions that include the newly added session, and the key ID (Key ID) of the last application key of each session performed under a rule (referred to as "old rule" hereinafter) under which application keys have been assigned respectively to all sessions that had existed before the aforementioned session have been added. Receiving the message 32, the node B transmits, to the node A, a message 33 containing an identifier (Ack) indicating the completion of reception and the key ID (Key ID) of the initial application key to be used by each session to be performed under the new rule.

It is appreciated that if a session is initially established between the node A and the node B where no session has existed therebetween before, there is no need to include data related to the old rule in the message.

It is basically possible that the quantities of application keys provided to applications are different between the node A and the node B. The node A, however, notifies the node B of what extent of application keys the node A has so far provided to the client application 200a under the old rule (a message 32). Receiving the message, the node B compares it with information of what extent of application keys the node B itself has so far provided to the server application 200b under the old rule. Based on the comparison, if the application keys prior to a last application key that has been used by either of the node A and the node B, a node that has provided more application keys than the other node, are provided under the old rule or are discarded, and if an application key newer than the last application key is selected as the application key for use in each session under the new rule and is thus reported (a message 33) to the node A, there will be no "deviation" in view of the synchronization of the application key.

Only in a case where one of the nodes provides a large quantity of application keys to an application or applications, however, does the other node possibly discard a large quantity of application keys, which compromises the efficiency of use.

It is noted that the above described rule is determined so that when there are, for example, three sessions, with MOD 3 (the residue of the division by 3) of key IDs being 0, 1 and 2, the application keys are assigned, and used, respectively to the first session, the second session and the third session.

Further, the rule may alternatively be determined so that even if there are three sessions, MOD 5 (the residue of the division by 5) of key IDs are calculated, and if the MOD 5 is 0, 1 and 2, the application key is assigned to the first session. Likewise, if the MOD 5 is 3 and 4, the application keys are assigned respectively to the second session and the third session. This configuration enables a specific session to use particularly many application keys. In this case, a weighting of the quantity of application keys assigned to a session is different for each session ID. The weighting may be determined in accordance with a throughput of application keys requested by the application.

In what expression of data such a rule is contained in a message is not particularly important. For example, an expression of "(MOD 3, 0: session ID1, 1: session ID2, 2: session ID3)" may constitute the expression of data of the rule shown in the first example.

With the above description, the assignment of application keys associated with new addition of a session is completed.

It is further noted that the above description is based on the assumption that the inter-node communication section 101 carries out the communication associated with a node-based signaling process and the communication associated with a session-based signaling process between the nodes via the inter-node cryptographic communication link 10. Modes of communications, however, are not limited as such. For example, the information of the session ID, rule, and key ID of a session-based signaling process may be exchanged between the nodes via a network (e.g., Internet) other than the inter-node cryptographic communication link 10. Further, the identifiers indicating start or reception completion of a session-based signaling process may also be exchanged between the nodes via a network (e.g., Internet) other than the inter-node cryptographic communication link 10. In contrast, the application keys and the key IDs added thereto for identification shall be exchanged by the inter-node communication section 101 via the inter-node cryptographic communication link 10 for maintaining the security.

<Cryptographic Communication End Process>

Figure 11:
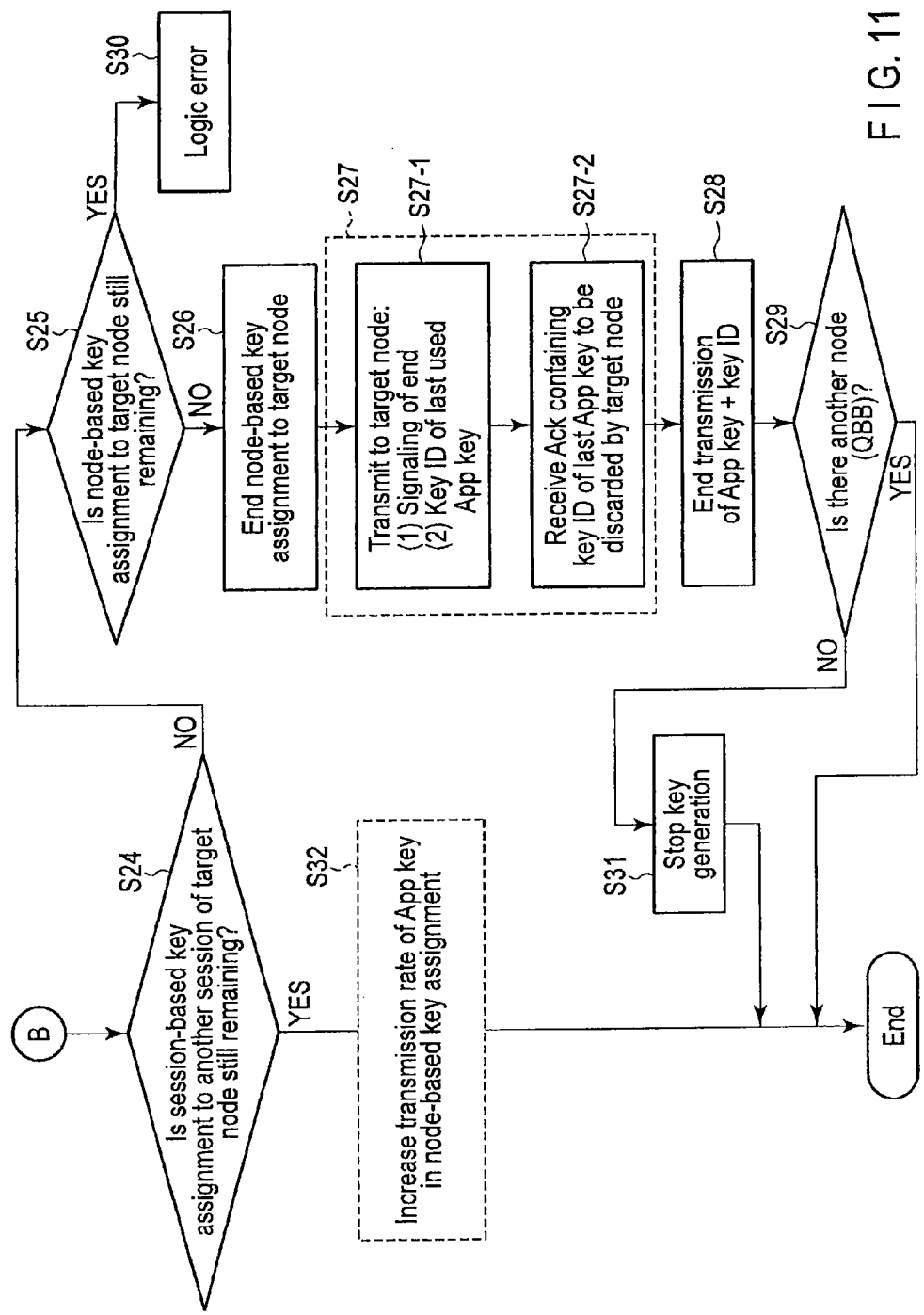
FIG. 11 is a flow chart of a cryptographic communication end process.

FIG. 10 and FIG. 11 show a flow chart of a cryptographic communication end process.

First, the application communication section 106 of the node A receives a request for ending the cryptographic communication from the client application 200*a*. In response to the request, the state management section 104 registers therein information of a session related to the cryptographic communication ended by the client application 200*a*.

The synchronization control section 103 refers to the state management section 104 to check whether assigning of a key of an application has already been started, the application corresponding to the session for which the request for ending the cryptographic communication has been received (step S20), and, if the assigning is not started (No for step S20), performs nothing. However, the event of receiving the request for ending the cryptographic communication from the client application 200*a* is a duplicate request for ending the session, and therefore the synchronization control section 103 may report the event to the client application 200*a* as an error (step S23).

If the assigning of a key of the application has already been started (Yes for step S20), the synchronization control section 103 starts a new session-based signaling process, with the session for which the request for ending has been received eliminated (step S21).

In the session-based signaling process (step S22), the synchronization control section 103 transmits, to a target node, the following: (1) a session end signaling containing a session ID (session ID) to be eliminated, (2) a rule for assignment of a new session-based key, and (3) the key ID (Key ID) of the last application key (App Key) of each session under the old rule (step S22-1). In response to the transmission, the synchronization control section 103 receives an Ack (an acknowledgement) containing the key ID (Key ID) of the initial application key (App Key) of each session under the new rule from the target node (step S22-2).

It is basically possible that the quantities of application keys provided to an application or applications are different between the node A and the node B. The node A, however, notifies (a message 34) the node B of what extent of the application keys the node A has so far provided to the client application 200*a* under the old rule. Receiving the message, the node B compares it with information on what extent of the application keys the node B itself has so far provided to the server application 200*b* under the old rule. As a result of the comparison, if the application keys prior to a last application key that has been used by either of the node A and the B, a node that has provided more application keys than the other node, are provided under the old rule or are discarded, and if an application key newer than the last application key is selected as the application key for use in each session under the new rule and is thus reported (a message 35) to the node A, there will be no "deviation" in view of the synchronization of the application key.

With the process described above, a rule for assignment of a key to each session after elimination of a session is determined and is agreed on between the nodes. The determined rule for assignment of a key is stored in the state management section 104. However, in a case where a session between the node itself and the target node is no longer left as a result of eliminating the aforementioned session, there is no need to determine assignment of an application key thereafter (i.e., a new rule), as described below.

In step S24, the synchronization control section 103 refers to the state management section 104 to check whether one or more sessions exist between the node itself and the target node that corresponds to a session for which the request for ending has been received (step S24).

If one or more such sessions remain, the synchronization control section 103 ends the processing without performing an operation (Yes for step S24). Here, if such a session remains, caution shall be taken in an event where the sequence of a node-based signaling process (i.e., step S6 shown in FIG. 7) is in progress. Here, as an alternative to ending the processing without performing an operation, the synchronization control section 103 may possibly execute a sequence of a node-based signaling process to lower the rate of assigning node-based keys (i.e., lower the transmission rate), thereby suppressing sharing of an application key that may be highly possibly wasted (step S32).

In contrast, if not even a single session currently exists between the node itself and the target node that corresponds to the session for which the request for ending the cryptographic communication applies (No for step S24), the synchronization control section 103 refers to the state management section 104 to check whether a node-based key assignment is performed between the node itself and the target node (step S25), and, if no assignment is performed, ends the processing as a logic error (step S30). If such assignment is performed, the synchronization control section 103 instructs ending of the node-based key assignment between the node itself and the target node (step S26), and, specifically, executes a node-based signaling process for ending an application key exchange between the node itself and the target node (step S27). In the node-based signaling process, the synchronization control section 103 transmits (1) a signaling of an ending, and (2) the key ID (Key ID) of the last used application key to the target node (step S27-1), and receives, from the target node, an Ack (an acknowledgment) containing the key ID (Key ID) of the application key to be discarded by the target node (step S27-2). Then the synchronization control section 103 ends the transmission of an application key and the key ID (App key+Key ID) to the target node (step S28).

Then, the synchronization control section 103 refers to the state management section 104 to check whether a node-based key assignment is currently performed between the node itself and one or more nodes (step S29), and if no such assignment is performed (No for step S29), meaning no application key exchange is performed, instructs ending of the generation of an application key (step S31).

Figure 12:
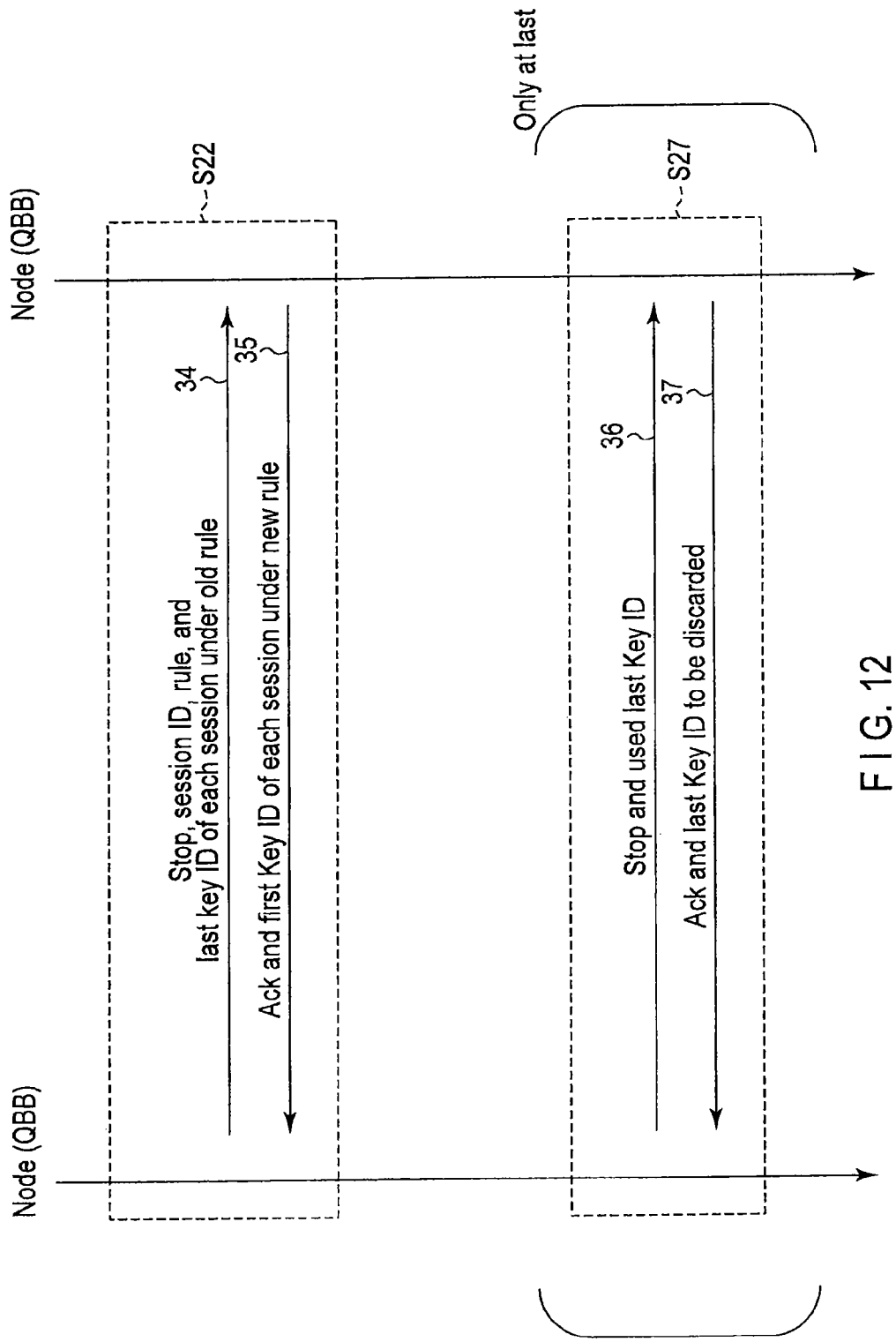
FIG. 12 is a diagram showing a sequence of a node-based signaling process and a session-based signaling process when ending cryptographic communication.

FIG. 12 shows a sequence of a node-based signaling process and a session-based signaling process when ending the cryptographic communication. For ending the cryptographic communication, the sequence of the execution of a session-based signaling process and that of the execution of a node-based signaling process are different from the sequence of execution for starting the cryptographic communication. The session-based signaling process is a communication process executed between nodes in step S22 shown in FIG. 10. The node-based signaling process is a communication process executed between nodes in step S27 shown in FIG. 11.

The session-based signaling process is nearly the same as the process for staring cryptographic communication. The differences are as follows. A message 34 to be initially transmitted contains an identifier (Stop) indicating elimination of a session, and an identifier of a session (session ID) to be eliminated, replacing the identifier of a session to be added.

The definition of a new rule constitutes a rule for assignment and using of application keys respectively to all sessions after a target session is eliminated, while the definition of an old rule constitutes a rule for assignment of application keys respectively to all sessions that had existed before eliminating the aforementioned session.

The message 35 shown in FIG. 12 is similar to the message 33 in starting cryptographic communication, shown in FIG. 9.

In the node-based signaling process in ending the cryptographic communication, the node A transmits a message containing an identifier (Stop) indicating an event of ending a node-based signaling process. Receiving the message, the node B transmits a message containing an identifier (Ack) indicating reception complete so that the node A receives the message.

However, when performing a node-based signaling process for restarting exchanging of an application key between the target node and the node A, the node A includes data in the following message in order to reuse an application key that had been previously exchanged and effectively use the exchanged application key (and a communication band used when exchanging the application keys). The key ID of the last (latest) application key used by the node A is included in the initial message 36. In a message 37 responded by the node B, the key ID of the last application key is included, the application key that is to be discarded and is necessary for confirming that a newer key is selected by comparing with the key ID of the last (latest) application key used by the node B and that the node A and the node B both discard (i.e., assume to have been used/provided to applications) older keys than the aforementioned selected key. In other words, with this processing, when the next exchanging of an application key is restarted between the same set of nodes, the application keys that have the key IDs exchanged here and thereafter can be used or provided for use in applications (i.e., sessions) as application keys that are already shared and are not yet used. This configuration enables an efficient use of the already exchanged application keys.

Figure 13:
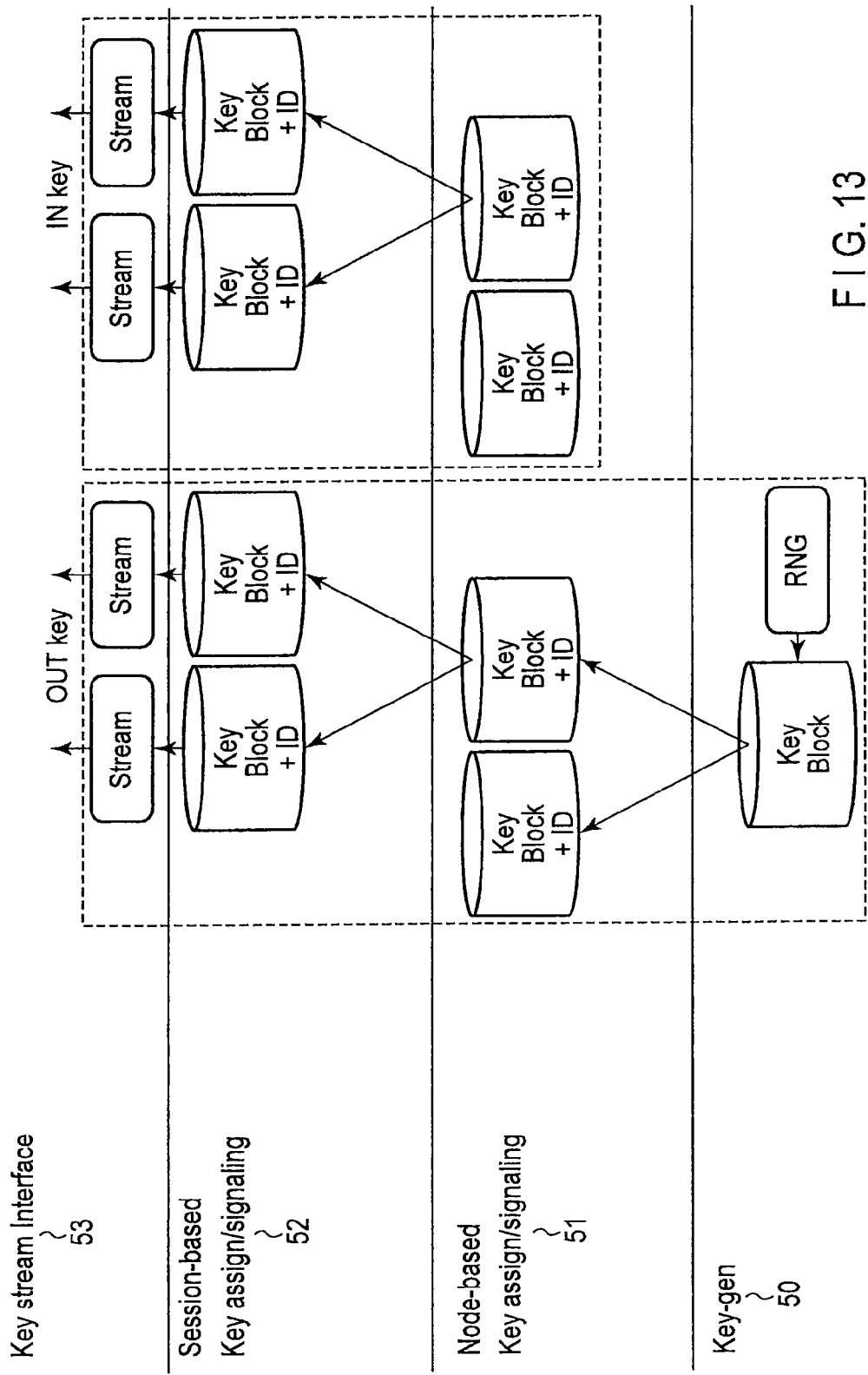
FIG. 13 is a diagram for describing an example of realizing assignment of an application key.

Next, a method for managing/assigning application keys (i.e., a key management architecture) at each node, the method for realizing the present embodiment, is described with reference to FIG. 13. FIG. 13 illustrates how to respectively manage application keys generated by a node and application keys received by a node.

As shown in FIG. 13, the key management architecture for a node according to the present embodiment is constituted by four layers (i.e., a key generation layer (Key-gen), a node-based assignment/signaling layer, a session-based assignment/signaling layer, and a key stream interface layer).

It is to be cautiously understood that FIG. 13 merely means an application key is grasped as various kinds of data in association with a progress in key assignment and session, and not that an application key is copied or used multiple times.

Further, the arrows between application keys merely mean that these application keys are respectively grasped differently in the individual layers, and can be realized by, for example, changing the correlation such as changing additional numbers in a database or merely changing a method for accessing the database.

In this example, application keys are discriminately managed by categorizing an application key generated by the node itself as an OUT key and the one received as an IN key. The OUT key is an application key for encryption used for transmitting data in cryptographic communication performed by an application. The IN key is an application key for decryption used for receiving data in cryptographic communication performed by an application. Correlating the OUT key and the IN key respectively with a generated application key and a received application key is merely an example. This example is used in the following description. However, other correlation methods are also possible. For example, a simple reverse correlation is possible, or another method in which only one node always generates keys, with correlation of an application having an ID with an OUT key/IN key separately determined when assigning keys and key IDs as described above is also available. In the meantime, a method for attaching IDs to application keys is not particularly described herein. Practically, a key ID is attached to an OUT key when generating the application key. A key ID of an IN key is simultaneously received when receiving the application key.

However, a few kinds of key IDs assigned to application keys may exist. For example, as described below, consecutively numbered key IDs in the order of generation may be assigned as one kind of key IDs when generating keys, and consecutively numbered key IDs by node may be assigned as another kind of key IDs when assigning the keys to nodes, and consecutively numbered key IDs may be assigned as yet another kind of key IDs when assigning keys to sessions on the nodes.

First, the key generation layer (Key-gen) is described. The key generation layer (Key-gen) is constituted by a typical random number generator and a storage for storing the key as an application key.

Next, a node-based key assignment/signaling layer is described.

Application keys (Key Block: OUT key) generated in a key generation process 50 are appropriately divided for each node that constitutes a destination, and key IDs that are respectively unique serial numbers in a closed range limited to each respective node are attached, in a node-based signaling process 51. The unit of application keys is transmitted to a destination node to be shared.

Also, application keys (IN keys) received in the node-based signaling process 51 are likewise managed separately for each node that constitutes a transmission source. The received application keys (Key Block) already have respective key IDs (i.e., unique serial numbers in a closed range limited to each node) attached.

Next, a session-based key assignment/signaling layer is described.

The application keys (either of IN keys and OUT keys) assigned to each node in a session-based signaling process 52 may be divided for each session and managed in a manner enabling the session to identify the keys. However, assignment to a session may possibly be changed in a session-based signaling process 52 triggered by, for example, an application ending the cryptographic communication or newly starting it.

There is no need to necessarily add consecutively numbered key IDs for each session. For example, a method enabling sequential accesses may be given to application keys assigned to each session. As such example, a session P(0, 1, 2) is enabled to access to consecutively numbered key IDs assigned to each node by sequentially increasing N of 3N+P in increments of "1" (assuming the number of sessions is "3").

Lastly, the key stream interface layer is described.

An application key actually provided to an application is a single application key obtained under the assignment rule determined in the above described session-based signaling process 52. It is, however, difficult to conceive that an application handles the size of an application key as is. Rather, it is more feasible to provide an application key in a smaller size (or in a variable length size) every time a request is received. Therefore, a buffer zone capable of storing two selected application keys for each session is prepared to store duplicate application keys therein for cyclical use. When one application key is likely consumed, the buffer will be filled with one more application key (referred to as a key stream interface process 53). As such, the utilization of the buffer makes it possible to reduce a temporal delay in providing an application key to an application.

A few exemplary modifications of the embodiment are described in the following.

According to the present embodiment, although control data (i.e., identifiers such as a key ID and a session ID) in addition to an application key are exchanged between nodes, what is necessary for cryptographic communication using a link key between the nodes is only the application key. Therefore, encryption is not necessarily required, for example, for communication in a session-based signaling process or when exchanging an ending sequence and the like in a node-based signaling process. Accordingly, an embodiment can be realized in which a simple inter-node communication takes place without using a link key when the above described control data is exchanged. Additionally, an embodiment can also be realized in which a non-encrypted communication route independent of a cryptographic communication network (that continually performs cryptographic communication using a link key) is separately created for exchanging the control data between nodes via the communication route. Further, an alternative configuration may comprise merely authenticating such control data (using a link key) without encrypting the control data.

Meanwhile, although the size of an application key has not been particularly referred to, the key of a fixed length (e.g., 1 Mbytes) unique to a system is typically used.

Further, communication of all signaling, the communication including the exchange of the application keys is predicated on the assumption that the communication is carried out on a transport that secures the reliability of communication. An example is execution of signaling on, for example, TCP/IP. The exchange of an Ack (an acknowledgment of arrival) message enables confirmation of reception of a signaling itself at a correspondent node. In the execution of all signaling on a transport such as TCP/IP, however, there is still a possibility of a TCP error (a socket error/timeout) or the like occurring. In such case, a recovery may be tried by responding as follows:

1. Detecting a TCP error at a node.
2. Storing the current session (i.e., a connected application) information.
3. A detecting node executing a node-based signaling process (in ending communication) between the node itself and a correspondent node of communications as a target of the TCP error, thereby resetting an application key shared between the nodes.
4. Executing one more time a node-based signaling process (in starting communication) and a necessary number of times of session-based signaling processes on the basis of the stored current sessions.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A communication node, comprising:
a key synchronization controller that controls synchronization of an application key on the basis of a node-based signaling process and a session-based signaling process, where the former process is for starting or ending exchanging of an application key between a correspondent node and the communication node and the latter process is for synchronizing a rule for assignment of the application key to a session with the correspondent node, the session shared with the correspondent node; and
an application communicator that provides the application key in accordance with the rule, the key for use by an application having the session,
wherein the key synchronization controller changes the rule depending on addition of the session and elimination thereof, and synchronizes the post-change rule with the correspondent node.

2. The node according to claim 1, wherein the rule represents that a weighting of quantity of the application key assigned to the session is different for each respective session ID.

3. The node according to claim 2, wherein the weighting is determined on the basis of a throughput of the application key, the throughput requested from the application.

4. The node according to claim 1, wherein a speed related to exchanging an application key and the exchange between the correspondent node and the communication node is changed on the basis of the number of sessions commonly managed between the aforementioned two nodes.

5. The node according to claim 1, wherein the application key is exchanged between the correspondent node and the communication node by means of quantum cryptographic communication.

6. A key synchronization method, comprising:
controlling synchronization of an application key on the basis of a node-based signaling process and a session-based signaling process, where the former process is for starting or ending exchanging of an application key with a correspondent node and the latter process is for synchronizing a rule for assignment of the application key to a session with the correspondent node, the session shared with the correspondent node; and
providing the application key in accordance with the rule, the key for use by an application having the session,
wherein controlling synchronization of the application key changes the rule depending on addition of the session and elimination thereof, and synchronizes the post-change rule with the correspondent node.

7. A key synchronization system for synchronizing an application key between a first communication node and a second communication node, wherein
the first communication node comprises:
a key synchronization controller that controls synchronization of an application key on the basis of a node-based signaling process and a session-based signaling process, where the former process is for starting or ending exchanging of the application key between the second communication node and the first communication node, and the latter process is for synchronizing a rule for assignment of the application key to a session with the second communication node, the session shared with the second communication node; and
an application communicator that provides the application key in accordance with the rule, the key for use by a first application having the session, and wherein
the second communication node comprises:
a key synchronization controller that controls synchronization of an application key on the basis of a node-based signaling process and a session-based signaling process, where the former process is for starting or ending exchanging of the application key between the first communication node and the second communication node, and the latter process is for synchronizing a rule for assignment of the application key to a session with the first communication node, the session shared with the first communication node; and
an application communicator that provides the application key in accordance with the rule, the key for use by a second application having the session.

8. A communication node, comprising:
a key synchronization controller that controls synchronization of an application key on the basis of a node-based signaling process and a session-based signaling process, where the former process is for starting or ending exchanging of an application key between a correspondent node and the communication node and the latter process is for synchronizing a rule for assignment of the application key to a session with the correspondent node, the session shared with the correspondent node; and
an application communicator that provides the application key in accordance with the rule, the key for use by an application having the session, wherein
the key synchronization controller executes the node-based signaling process and then the session-based signaling process in starting the session, and
executes the session-based signaling process and then the node-based signaling process in ending the session.

9. A communication node, comprising:
a key synchronization controller that controls synchronization of an application key on the basis of a node-based signaling process and a session-based signaling process, where the former process is for starting or ending exchanging of an application key between a correspondent node and the communication node and the latter process is for synchronizing a rule for assignment of the application key to a session with the correspondent node, the session shared with the correspondent node; and
an application communicator that provides the application key in accordance with the rule, the key for use by an application having the session, wherein
the key synchronization controller changes the rule depending on addition of the session and elimination thereof, and synchronizes the post-change rule with the correspondent node, and
the key synchronization controller exchanges, between the correspondent node and the communication node, a key ID of an application key used lastly under a rule prior to the change and a key ID of an application key to be used first under a rule after the change.

* * * * *